Oct. 17, 1967 P. F. KING 3,348,232

ASYNCHRONOUS PAGE-AT-A-TIME PRINTER

Filed Sept. 5, 1962 3 Sheets-Sheet 1

INVENTOR.
PAUL F. KING

BY Stanley Z Cole

ATTORNEY

INVENTOR.
PAUL F. KING
BY Stanley Z. Cole
ATTORNEY

INVENTOR.
PAUL F. KING
BY
ATTORNEY 3,348,232
ASYNCHRONOUS PAGE-AT-A-TIME PRINTER
Paul F. King, Webster, N.Y., assignor to Xerox Corporation, Rochester, N.Y., a corporation of New York
Filed Sept. 5, 1962, Ser. No. 221,471
4 Claims. (Cl. 346—74)

The present invention relates generally to data recording and more specifically to a high speed electrostatic page-at-a-time printer.

Although high speed printers have been and are being used in communications systems computer outputs and the like, the great thirst for printers of even increasing speeds occasioned by the fairly recent advent of the electronic computer is not yet satisfied. Basically, all electronic computers, however complex they may appear, are made up of three components; namely, an input system by means of which information is introduced into the computer, an operation system generally including calculating and storage elements for carrying out the mathematical functions entailed in solving the problem presented, and an output section for printing or recording the results. The electronically operated operations section of a computer has always been its fastest section and with the recent introduction of switching devices having speeds in the low nanosecond range the operations sections of new computers are becoming faster than ever, far outdistancing the input and output sections in speed. The use of improved tape handlers and recording techniques which result in higher bit packing densities have speeded up magnetic tape computer input sections to a point significantly above the capabilities of output printers currently in commercial use. This has necessitated the use of either really huge output storage devices directly coupled to an output printer or the magnetic recording of output for use in a number of peripheral output printers thus greatly increasing the cost and complexity of the computer system as a whole.

"High speed" output printers currently in commercial use are generally of the electromechanical variety utilizing solenoid actuated printing hammers. Because of the inertia problems inherent in electromechanical printers, this type of printer is being largely ignored by those attempting to develop output printers of significantly higher speeds. Thus, since the time of the pioneer invention of electrostatic alphanumeric printing as described in British Patent 734,909 to Carlson, issued Aug. 10, 1955, attention has begun to focus primarily on electrostatic printing as is indicated for example by U.S. Patent 2,919,967 to Schwertz. Although the above Schwertz patent describes a line-at-a-time printer in which the printing web is advanced a distance equivalent to one line of type after that line is printed, this type of printer may also use a continuously moving web in which the speed of the printing pulse acts to "freeze" or "stop" the motion of the web. This second type of printer is very fast but it requires a continuous supply of information ready for printing while it is in operation or the information printed will be spread out over vast expanses of the printing web. Thus, this type of printer usually utilizes a very large information storage or memory device because computational output from the computer or communications system occurs sporadically owing to either the time required for computation in the computer or to the fact that input to the computer or messages input to the communications system is sporadic as in the case of punch card input. Obviously, this type of printer may also be used to great advantage to repeatedly print the same information.

In contrast to the printer which utilizes a coninuously moving printing web there is the asynchronous printer in which printing and web feed occur only in response to computer output signals or message transmission. Owing to this type of operation an output memory system for the computer is generally unnecessary except for a small buffer memory to temporarily hold sporadic bursts of very high speed output from the computer during printing. It may thus be seen that both continuously operated and asynchronously operated electrostatic output printers have their own places as computer output devices.

Even though the printing speed of asynchronously operated electrostatic printers of the line-at-a-time type described in the Schwertz patent supra greatly exceeds that of mechanical line-at-a-time printers owing to reduction in the time needed for image formation into the low end of the 2–10 microsecond range, the maximum speed of even these electrostatic printers is inherently limited by the minimum time of about 20 milliseconds required to advance a printing sheet one line-at-a-time between successive line prints. Neglecting the relatively very minute time necessary for image formation in the electrostatic system, line-at-a-time paper advance limits printing speed to about 50 lines per second at best.

Accordingly, it is an object of this invention to provide a very high speed electrostatic printing system and device capable of producing output a page-at-a-time.

It is also an object of this invention to provide an electrostatic printing system and device which substantially reduces delays in output of output printers because of paper advance.

The above and still further objects, features, and advantages of the present invention become apparent upon consideration of the following detailed disclosure of the invention especially when taken in conjunction with the accompanying drawings wherein.

Figure 1:
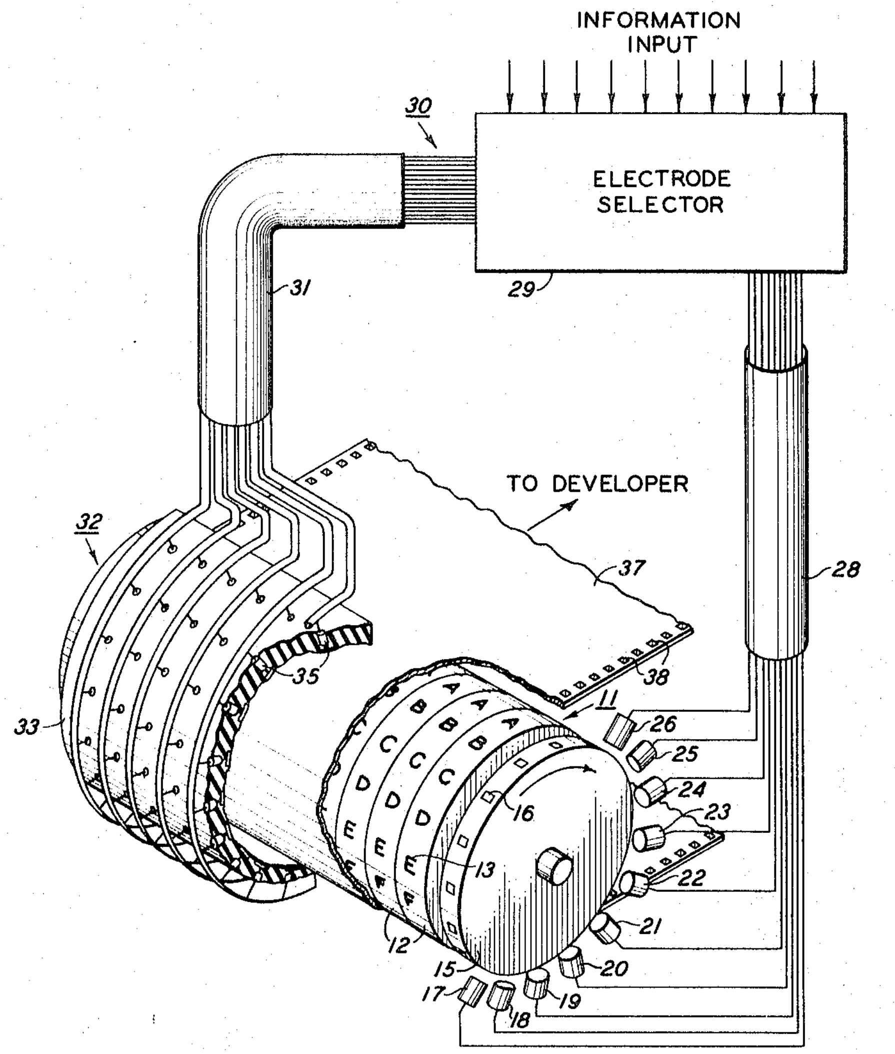
FIGURE 1 is a perspective partially cut-away and partially diagrammatic view of a complete embodiment of this invention.
Figure 2:
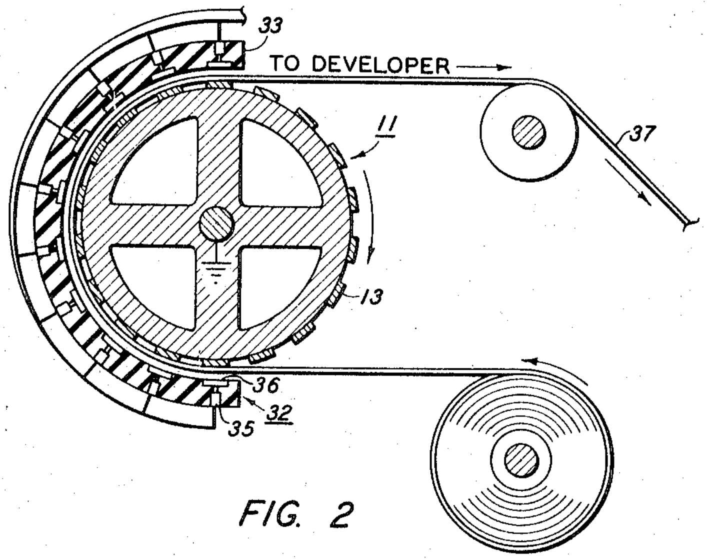
FIGURE 2 is a side-sectional view of the printing electrodes shown in FIGURE 1.

Referring now to FIGURE 1, there is illustrated a rotatable alphanumeric character cylinder 11. Cylinder 11 is driven at a high constant angular velocity which may range up to 2,000 revolutions per second and more depending upon considerations of cost, reliability, printing speed required, and the like. Across the cylinder is a bank of identical character rings 12 each containing a circumferential arrangement of conductive raised characters 13. One ring of characters is provided for each column to be printed on the page. The characters in each ring may be composed of alphabetical letters, numbers, or any other arbitrary symbols as desired and the raised conductive characters may be surrounded with insulating material to make the drum surface smooth if desired. At one end of the cylindrical shaft is a disk 15 carrying a number of magnetic marks 16 on its outer periphery. One magnetic mark is provided for each character in a character ring, the marks being aligned with the line or row of identical characters. Thus one magnetic mark is provided for the line of B's along the length of the drum, one mark is provided for the line of C's along the length of the drum, etc. As described more fully hereinafter one magnetic reading head such as 17–26 is spaced slightly from the disc 15 for each line of type to be simultaneously printed. These reading heads pick up a pulse for each magnetic mark moving past them and transmit the pulses through a cable 28 containing a number of wires equal to the number of reading heads to an electrode selector 29. Using the ten reading heads 17–26 illustrated in FIGURE 1, the printer may be operated so as to print ten lines of information simultaneously. By increasing or decreasing the number of reading heads and modifying the circuitry of the electrode selector 29 more or less lines of type may be simultaneously printed. Pulses from the reading heads, after being fed into the electrode selector, are compared with coded input information as, for example, from a computer. The selector circuit then electrically activates any one or more of its output lines generally designated 30 which lead through cable 31 to backing electrodes 35 in an electrode shroud generally designated 32, thus forming an electrostatic image on a recording web between the cylinder 11 and electrode shroud 32 in the form of the particular character electrode opposite the activated backing electrode 35 at the time of activation as more fully described hereinafter. The shroud is made up of a semi-cylindrical insulating base 33 which is concentric with and spaced slightly from alphanumeric cylinder 11, as is shown most clearly in FIGURE 2. Although the shroud is cut away in FIGURE 1, it generally extends for at least the whole length of the alphanumeric cylinder. A' number of electrodes 35 having relatively flat surfaces 36 (as compared to the raised character electrodes) on the side of electrode shroud 32 facing the alphanumeric cylinder are placed in rows and columns in the shroud base 33. The number of electrode columns is the same as the number of character rings on alphanumeric cylinder 11, which determines the number of columns of information which may be printed. The number of rows of electrodes in the electrode shroud determines the number of rows of printing which may be formed on one page of print prior to its advance. Thus an electrode shroud containing ten rows of electrodes could print ten lines of information on a sheet of paper prior to paper advance while an electrode shroud with 40 rows of electrodes could print 40 lines of information prior to paper advance, while the number of characters which may be printed on each row or line depends on the number of character rings and corresponding number of backing electrode columns.

All output lines 30 from electrode selector 29 may be permanently connected to all of the electrodes 35 on electrode shroud 32, for example, by soldering or crimping or, alternatively, these connections may be temporary using plug-in or screw-down connectors or the like. The temporary-type connection is especially valuable where printing density on a page is relatively low and printing positions on a page are regularly varied after intermediate length printing runs. For example, the temporary plug-in connections might be valuable for printing 5,000 checks, followed by the printing of 7,500 bills, followed by 1,500 time cards, etc. In these cases, since names and amounts on the forms might be printed in different positions for each type of form, only a limited number of plug-in connections to the electrode shroud are necessary. Thus a name may be printed on the top line of a bill by plugging in a group of plug-in connectors leading from electrode selector 29 to the top row of the electrode shroud 32. The name printing may then be moved to the center of the form for check printing merely by moving the name printing plug-in connectors down to the middle row of sockets in electrode shroud 32 and adjusting input leads from character counters 17–26 accordingly.

Printing in this invention is accomplished by the tesi-printing technique, which broadly speaking, comprises forming a latent electrostatic image on a printing web and developing or making the image visible by the deposition thereon of electrostatically attractable, finely divided, colored material, which is referred to in the xerographic art as toner. This printing technique is also described in the above-noted patent to Schwertz. The electrostatic latent image is formed on the recording or printing web by controlled or selective charging resulting from an ionizing field discharge between a shaped character electrode and a relatively flat-surfaced backing electrode caused by a high-voltage, short-duration pulse across the electrodes. Since field discharge is generally confined to the shape of the character electrode used, the latent electrostatic charge pattern on the recording web corresponds to the shape of the activated character electrode. The electrostatic latent images are formed on a dielectric printing web such as Mylar, well-dried paper, paper coated with Cymac (an alkyd resin available from American Cyanamid Corporation), or any other dielectric substance having a sufficiently long time constant to hold an electrostatic image for a period which permits subsequent utilization of the image by transfer to another surface or by development. In FIGURE 1 printing web 37 is shown with sprocket feeding holes 38 of the type in common use in business printing firms to facilitate accurate feeding. It should be noted, however, that this edge-punched-type form is not necessary or critical to the invention.

Although printing parameters such as gap spacing between the backing electrode shroud and the character electrode drum, pulse duration, pulse magnitude, and relative humidity each have their own independent effects upon image formation and generally produce acceptable printing over a fairly wide range, some nominal printing parameters are given below for purposes of illustration. Generally, the best printing results are obtained with gap spacings between the character electrode on the alphanumeric drum and the backing electrode shroud of from two to seven mils. When a continuous bias voltage below that necessary to initiate an ionizing field discharge in the electrode gap is continuously applied across the gap a much reduced pulse may be employed for image formation. For example, a nominal bias potential of 700 volts is continuously applied (although this voltage might range anywhere from 400 to 1,400 volts) and a 900-volt pulse (which might range anywhere from 600 to 1,100 volts) is superimposed upon the bias potential but only across the selected character electrode and its corresponding backing electrode. This initiates a character-shaped ionizing field discharge between these electrodes thus depositing a charge pattern in the form of the selected character on the recording web in the electrode gap. It has been found that with some printing parameters a pulse width as narrow as 1.5 microseconds is effective to form the desired electrostatic latent image and in almost every other instance the maximum necessary pulse width is 6 microseconds with 3 microsecond pulses being standard. It has also been found that printing reliability varies with ambient relative humidity and that printing reliability may be improved by using a brass or copper backing electrode and illuminating it with ultraviolet light from the short wave length end of the ultraviolet portion of the spectrum. A Hanovia type 93A–1 tubular lamp mounted a few inches from the air gap has been found to be very effective in this respect. Even with an alphanumeric cylinder rotating at 1,200 revolutions per second, a 3–6 microsecond pulse will form a clear image on the recording web in the form of the character electrode opposite the activated backing electrode at the time of pulse application. Thus short pulse application effectively acts in a manner analogous to a high-speed flash camera in that it "stops" the motion of the alphanumeric cylinder. By comparing alphanumeric cylinder position with the information to be printed as it is fed in from the information input source and activating the proper backing electrodes 35 at the proper time in the rotation of the alphanumeric cylinder a number of complete lines of type which may form a whole page of print may be formed on recording web 37 between successive recording web advances.

Once the proper electrostatic latent images are formed on recording web 37 by the electrodes 35 and electrode shroud 32 acting in conjunction with alphanumeric cylinder 11 the web is fed to a developing station where the images are generally developed or made visible by depositing finely divided electroscopic marking material termed "toner" in the art on the recording web. By imparting a charge to the developing particles opposite in polarity to the charge deposited on recording web 37, the recording web selectively attracts toner particles in formed electrostatic image configuration. Some of the techniques now in use for developing latent electrostatic images in xerography serve admirably for developing recording web 37. For example, a powder cloud developing apparatus such as those disclosed in U.S. Patent 2,862,646 to Hayford and 2,918,900 to Carlson may be used. Another developing technique which produces especially good results involves the use of a two-element developing mixture as described in U.S. Patents 2,618,551 to Walkup, 2,618,552 to Wise, and 2,638,416 to Walkup and Wise. This type of developing mixture includes the finely-divided electroscopic developing particles known in the art as toner and carrier beads. As described in the above noted patents, the carrier beads are grossly larger than the toner particles and carry these particles to the surface to be developed, imparting a charge to the particles by virtue of the relative positions of the toner particles and carrier beads in the triboelectric series. Thus the carrier beads pick up the toner particles in the developing mixture and impart a charge to them. This developing mixture is then cascaded over the electrostatic image to be developed and the charge which constitutes the image, by virtue of its stronger field, pulls toner particles off the carrier beads leaving these toner particles on the surface being developed in image configuration. Any of the well-known developing techniques generally used in xerography may be utilized for development of the recording web 37 after the desired electrostatic latent image has been formed upon it. Some additional xerographic developing techniques are described in great detail in U.S. Patents 2,761,416 to Carlson, and 2,895,847 to Mayo.

Once the developing process has been completed, the deposited particles may then be fixed upon the surface of printing web 37 by the application of radiant heat to partially melt the particles fusing them to the surface of recording web 37, by the application of pressure, solvent spray, or solvent fumes as described in U.S. Patents 2,297,691 and 2,776,907 to Carlson.

Depending upon the mode of operation of the printer of this invention, alphanumeric cylinder 11 must rotate one or more times with respect to the stationary printing web for each advance of the web. For example, if all desired backing electrodes are activated during one rotation of the alphanumeric cylinder thus printing a whole page of information during this rotation, the cylinder will rotate only once with respect to the stationary printing web prior to each successive page advance of the web. If, however, simpler and less expensive activating circuitry is utilized to print only one line of information with one row of backing electrodes for each rotation of alphanumeric cylinder 11, the cylinder must rotate ten times with respect to the stationary printing web prior to each successive page advance of the web in order to print a ten-line page.

Figure 3:
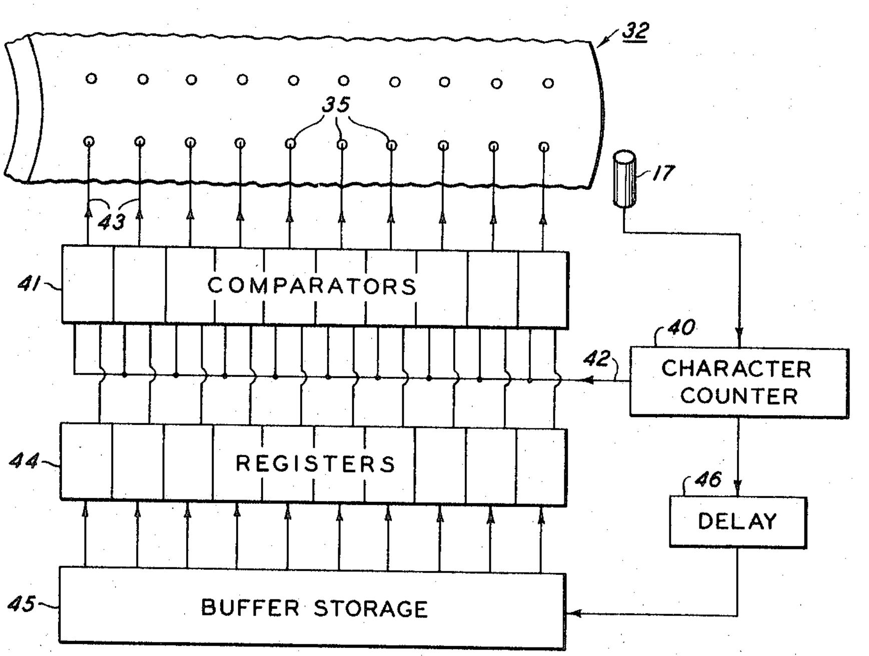
FIGURE 3 is a block circuit diagram showing one type of actuating circuit which may be used with the printer of this invention.

FIGURE 3 illustrates a portion of an exemplary activating circuit capable of printing a complete page of information for each rotation of alphanumeric cylinder 11. A cut-away portion of electrode shroud 32 is shown in FIGURE 3 with connections to one row of electrodes 35 from the portion of activating circuitry necessary to activate this row of electrodes. Duplicates of the illustrated circuitry are required to activate each row of electrodes used in the electrode shroud. In this view magnetic pick-up head 17, which is also shown in FIGURE 1, feeds pulses to a character counter 40. Pick-up heads 18–26 are used to feed the character counters in the activating circuitry for any additional lines of print. Character counter 40 may be of well-known ring counter construction and should contain enough sections to enable it to count up to the number of magnetic spots 16 around disc 15 corresponding to the number of different character elements around each circumferential character ring on alphanumeric cylinder 11. All outputs of character counter 40 are applied in parallel to comparators 41 through cable 42. One comparator is provided for each electrode 35 in the row of electrodes being actuated and each comparator is connected by means of a wire 43 to its corresponding electrode 35 so that the output of the comparators may be applied to the electrodes. If necessary or desirable, gated amplifiers or blocking oscillators may be provided between the output of the comparators and their corresponding electrodes in order to apply a pulse of the proper magnitude to activated conductors; however, these pulsing means may be included in the comparator circuit. Comparators 41 accept input information from character counter 40 and compare it with additional information from registers 44, applying an output pulse to their respective output leads 43 when coincidence occurs between counter input and register input. The number of register and comparator sections corresponds to the number of electrodes 35 in the electrode row to be actuated which also corresponds to the number of character rings on the alphanumeric cylinder 11. Even if each character ring on alphanumeric cylinder 11 contains 63 different arbitrary alphanumeric cylinders each of these may be described and differentiated from all of the other characters with a six bit binary code. Thus registers 44 must each be able to contain six bits of binary information. For example, each register section 44 may contain six bi-stable storage elements which may be destructively read out to the comparators when coincidence occurs between information stored in the registers and character counter input to the comparators. Since coincidence will occur for the information in all of the registers at one time or another in the rotation of the alphanumeric cylinder, in this mode of operation information moves serially out of each register and all registers are fully cleared after one complete rotation of alphanumeric cylinder 11. Although the registers must each be six bits wide they must only be one bit long and each register operates int he serial-in, serial-out fashion. After one revolution of alphanumeric cylinder 11 and clearing of the registers, new information is fed into the registers from buffer storage 45 which is addressed through delay element 46 only by the last output stage of character counter 40 which also initiates page-at-a-time paper advance. Once the buffer storage is addressed the character counter is disabled during printing web advance. Thus character counter 40 applies only one pulse through delay element 46 for each complete rotation of alphanumeric cylinder 11, placing new information in the registers just after the last comparison made at the end of one full revolution of alphanumeric cylinder 11. Many different addressing techniques well known in the computer art could be utilized in the operation of this invention, for example, the pulse after passing through delay element 46 could be applied to the input of a second ring counter and the outputs of the second ring counter could be used for half-current addressing to a magnetic core matrix buffer storage with the other half-current output lines of the matrix extending into registers 44.

Figure 4:
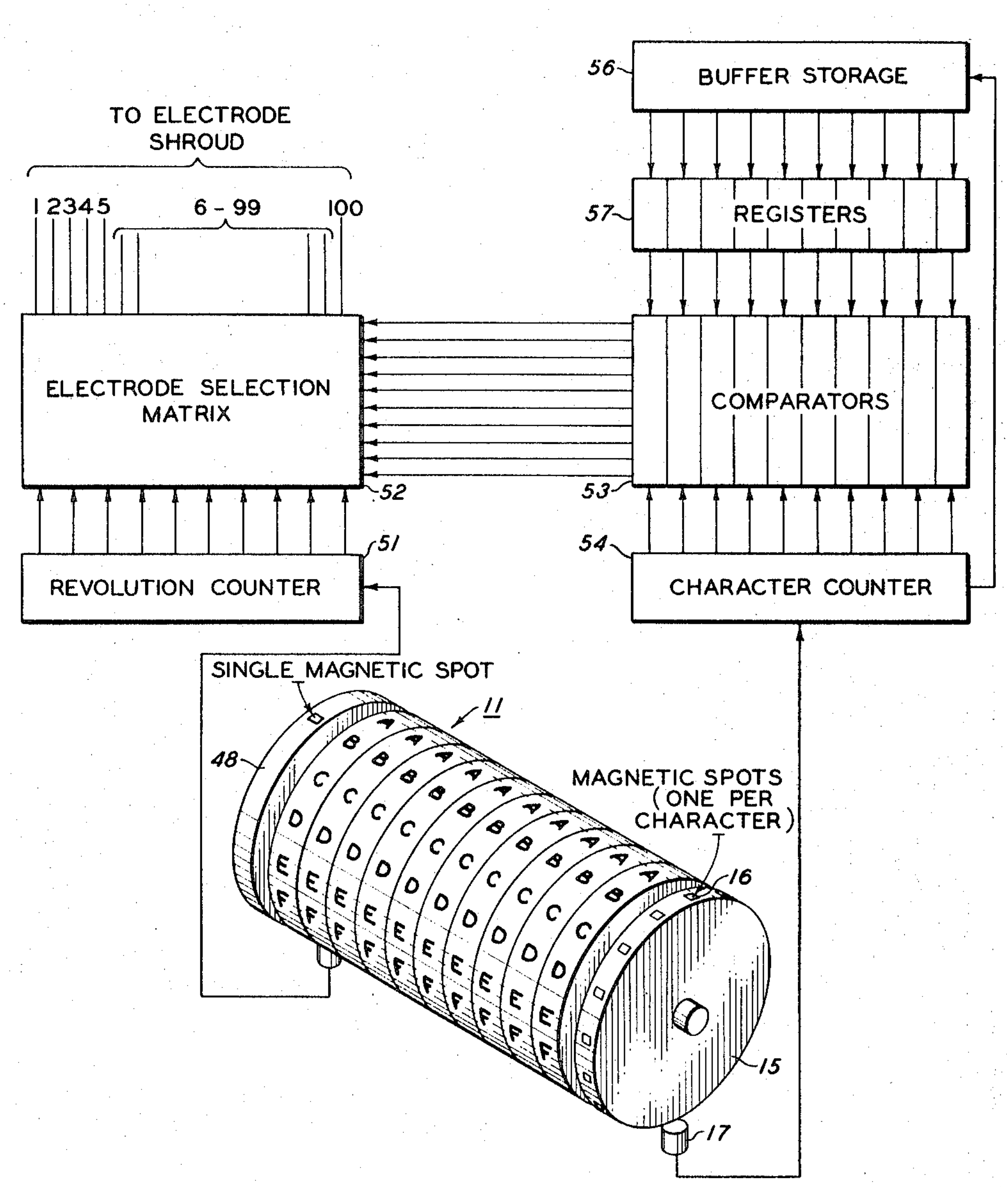
FIGURE 4 is a block circuit diagram of a second type of actuating circuit which may be used with the printer of this invention.

In FIGURE 4 there is illustrated an exemplary activating circuit for operating the novel printer of this invention so that one line of print is formed on the printing web for each complete revolution of the alphanumeric cylinder 11. Although only one line of print is formed per alphanumeric cylinder revolution, the novel shroud construction of this invention allows for the formation of a complete page of print between successive advances of the printing web since for each revolution of the alphanumberic cylinder, electrostatic images are formed on the printing web between selected characters on the alphanumeric cylinder and one of a successive row of backing electrodes in electrode shroud 32. Although electrode shroud 32 is not shown in FIGURE 4 so as to simplify this drawing, it is of the same construction as the shroud shown in FIGURES 1 and 2. Alphanumeric cylinder 11 is also of the same construction as the alphanumeric cylinder illustrated in FIGURES 1 and 2 except for the fact that it is provided with a second disc 48 at its end opposite disc 15. This disc is provided with one magnetic spot 49 on its outer periphery. Each time this spot passes pick-up head 50 the pick-up head generates the pulse and feeds it to revolution counter 51. Thus the count in counter 51 is indicative of the number of full revolutions which have been made by alphanumeric cylinder 11. Counter 51 has a counting capacity equal to the number of rows of print to be formed on the recording web which also corresponds with the number of rows of backing electrodes 35 in electrode shroud 32. This counter may also be of the familiar ring counter type. The outputs of revolution counter 51 are connected to a row selection matrix 52 made up of a number of coincidence gating circuits. Assuming that the electrode shroud 32 contained ten rows and ten columns of backing electrodes 35, the 100 backing electrodes in the shroud would be connected to the output of row selection matrix 52 since only one of the outputs of revolution counter 51 is activated during each successive rotation of alphanumeric character cylinder 11. The revolution counter acts to select successive rows of ten electrodes which may be activated by a second group of ten input lines from comparators 53 to electrode selection matrix 52. In other words, the revolution counter 51 acts to switch the ten input lines from comparators 53 to successive rows of electrodes in electrode shroud 32 for each revolution of the alphanumeric cylinder 11, and then activates the paper feed to advance it a full page.

The remainder of the circuit is essentially the same as that described in connection with FIGURE 3 above. One pulse per line of characters is fed to a character counter 54 from a pick-up head 17 and the output of the character counter is applied in parallel to all sections of a ten-section comparator 53. The last stage of character counter 54 is also applied to address a buffer memory 56 which feeds new information in to a ten-section register 57 similar in construction to registers 44 described in connection with FIGURE 3 above. The information contained in the registers is then compared in the ten sections of the comparators 53 with the output of character counter 54 and an output pulse is applied through one or more of lines 58 to electrode selection matrix 52 at the time when coincidence occurs between register input and character counter input to the comparator.

An even simpler circuit of the type described in U.S. Patent 2,919,967 to Schwertz may be employed so as to actuate only one backing electrode for each revolution of alphanumeric cylinder 11. In this case an output ring counter similar to ring counter 27 shown in FIGURE 1 of the Schwertz patent would be connected so as to sequentially activate one electrode after another in the first row of electrodes and then to activate one electrode after another in a second row, etc.

It is apparent, then, that the electrode shroud of this invention considerably reduces the time required to form a number of lines of print since it may form them within one revolution of the alphanumeric cylinder with the proper circuitry. But, regardless of whether the electrostatic image is formed one character, one line, or one page at a time using relatively simple or relatively complex circuitry for activating the image-forming electrodes printing time will be reduced because of a great reduction in paper advance time owing to the fact that a complete page may be printed prior to any paper advance and the paper is advanced a full page at a time instead of a line at a time. Since as stated above, the fastest line-at-a-time paper advance speeds range down to a limit of about 20 milliseconds per line whereas a 40-line page may be advanced in about 100 milliseconds, the printing system of this invention reduces paper advance time for a 40-line page from 800 milliseconds down to about 100 milliseconds for approximately an 8 to 1 reduction. When running alphanumeric cylinder 11 at a conservative speed of about 10 milliseconds per revolution, image formation would require 10 milliseconds with the circuit of the type described in connection with FIGURE 3 and about 400 milliseconds when using a circuit of the type described in connection with FIGURE 4, in order to print a 40-line page. Comparing these speeds with "high speed" electromechanical printers which will print 10 lines per second of alphanumeric characters we see that a 40-line page would require about 4 seconds to print as opposed to a time of 110 milliseconds with the FIGURE 3 circuit and about 500 milliseconds with the FIGURE 4 circuit and the shroud electrode of this invention. Time reductions here are about 8 to 1 for the relatively simple activating circuitry of FIGURE 4 and approximately 40 to 1 for the more complex activating circuitry of FIGURE 3. It should therefore be obvious that this invention constitutes a giant step forward in the art of high-speed printing.

What is claimed is:

1. A high-speed, electrostatic printing apparatus comprising, a cylindrical alphanumeric wheel having a bank of like character rings on its surface, each ring containing a series of conductive electrodes with character shaped end faces in a circumferential arrangement around said wheel, means to rotate said wheel at a high uniform velocity, a backing electrode shroud concentric with and spaced slightly from said wheel, said electrode shroud containing a plurality of rows and columns of relatively flat surfaced backing electrodes, each electrode being electrically separated from every other electrode, said columns of electrodes being spaced opposite and corresponding to the rings of said alphanumeric wheel, means to intermittently feed an insulating printing web through the curved gap formed by said alphanumeric wheel and said electrode shroud a distance equal to the length of said shroud and then hold said web in stationary contact with the entire portion of said rotating wheel which defines said gap, signal generating means for generating a signal analog of the angular position of said wheel, comparator means connected to said signal generator and to a source of coded electrical input printing signals and responsive to coincidence between coded electrical input signals and input signal analogs of the angular position of said alphanumeric wheel to apply voltage pulses between selected backing electrodes and said wheel at any time when a character on said wheel corresponding to said coded input signal is opposite said selected backing electrode, said voltage pulses being of a magnitude sufficient to initiate ionizing field discharges across the gap between said pulsed backing electrodes and said alphanumeric wheel so as to form selected, character shaped, latent electrostatic images in selected positions on said printing web and means to activate said web feeding means all printing on the printing web portion then opposite said electrode shroud is completed whereby high-speed page-at-a-time printing is achieved.

2. A high-speed printing apparatus according to claim 1 further including separable connectors between said comparator means and said backing electrodes whereby the relative printing position of information on a page may be varied by merely disconnecting the comparator output pulsing leads from one set of backing electrodes and reconnecting them to a different set of backing electrodes at a different position on said electrode shroud.

3. Apparatus according to claim 1 including a number of coded electrical input signal lines equal to at least the number of backing electrodes to be activated during one revolution of said alphanumeric wheel and in which said comparator means applies pulses to backing electrodes corresponding to coded input signal lines carrying signals corresponding to the input signal analog of the angular position of said alphanumeric wheel when there is coincidence between said angular signal analog and said coded input signals.

4. Apparatus according to claim 1 including a number of coded electrical input signal lines equal to the number of backing electrodes in said electrode shroud, said comparator means including means to compare said coded electrical input signals with the input signal analog of the angular position of said alphanumeric wheel and to apply a voltage pulse to any backing electrode for which there is coincidence between said coded electrical input signal and said analog signal at the time of said coincidence.

References Cited

UNITED STATES PATENTS

| | | | |
|---|---|---|---|
| 2,692,551 | 10/1954 | Potter | 178—29 |
| 3,060,432 | 10/1962 | Schwertz | 346—74 |

BERNARD KONICK, *Primary Examiner.*

IRVING L. SRAGOW, M. K. KIRK, V. P. CANNEY, *Assistant Examiners.*